United States Patent [19]

Bogardy

[11] Patent Number: 5,589,528
[45] Date of Patent: Dec. 31, 1996

[54] HOT MELT GLUE BASED ON MODIFIED WATERBEARING GELS

[76] Inventor: Lawrence S. Bogardy, 3243 Decker St., Bartlett, Tenn. 38124

[21] Appl. No.: 598,089

[22] Filed: Feb. 7, 1996

Related U.S. Application Data

[63] Continuation of Ser. No. 259,024, Jun. 13, 1994, abandoned.

[51] Int. Cl.$^6$ .............................. C08L 89/00; C09J 4/00
[52] U.S. Cl. .............................. 524/17; 524/18; 524/19; 524/21; 156/328; 106/124.5; 106/124.51; 106/124.6; 106/124.61; 106/135.1; 106/145.1; 106/146.1; 106/125.1; 106/126.1; 106/162.9; 106/163.01; 106/206.1
[58] Field of Search .............................. 524/9, 10, 11, 524/17, 18, 19, 21, 22, 23, 25, 27, 35, 47, 55, 58; 106/124, 125, 135, 136, 138, 146, 147, 154.1, 163.1, 205, 208, 209, 210, 213, 214, 218, 236, 238, 239; 156/326, 327, 328, 336

[56] References Cited

U.S. PATENT DOCUMENTS

| | | |
|---|---|---|
| 4,569,985 | 2/1986 | Frihart et al. |
| 4,602,058 | 7/1986 | Graham. |
| 4,656,242 | 4/1987 | Swan et al. |
| 4,725,488 | 2/1988 | Swan et al. |
| 4,992,100 | 2/1991 | Koepff et al. .......................... 106/125 |
| 5,362,801 | 11/1994 | Amici et al. .......................... 525/57 |
| 5,382,451 | 1/1995 | Johnson et al. .......................... 427/208.4 |

FOREIGN PATENT DOCUMENTS

| | | |
|---|---|---|
| 4225465 | 2/1994 | Germany. |
| 5287249 | 11/1993 | Japan. |

*Primary Examiner*—Nathan M. Nutter
*Attorney, Agent, or Firm*—Deveau, Colton & Marquis

[57] ABSTRACT

A water-soluble, biodegradable, repulpable, waterbearing colloidal hydrogel material manufactured from a mixture of natural organic materials, water and additives which is capable of being heated and applied with hot melt glue application equipment for use in paper bag sealing, corrugated and paperboard carton closure, and fishing lures.

21 Claims, No Drawings

HOT MELT GLUE BASED ON MODIFIED WATERBEARING GELS

This is a continuation of application Ser. No. 08/259,024 filed on Jun. 13, 1994, and now abandoned.

BACKGROUND OF THE INVENTION

1. Field of the Invention

This invention is related generally to the manufacture and direct use of waterbearing gels as hot melt glues, and specifically to a water soluble, biodegradable, repulpable, waterbearing gelatinous product based on natural organic animal, mineral and/or vegetable thermoreversible waterbearing gels which are capable of being heated and applied with automatic hot melt glue application equipment, such as automatic piston and gear pump hydraulic glue application equipment for packaging sealing purposes, such as for bag sealing, tray making and corrugated carton closure. This invention also is directed generally to products made from a further modified product of the waterbearing gelatinous product of this invention, and specifically to fishing lures in the form of artificial baits, such as worms, which are extruded, cast, or injection molded from the hot melt glue.

2. Prior Art

Waterbearing gels, or colloids, as a general class are known by those skilled in the art. Such waterbearing gels include a wide variety of thermally reversible gels, typically in the form of semi-solid masses. These semi-solid masses generally are supersaturated solid materials in which the water molecule is chemically bound to the solid material.

Likewise, hot melt glues and application equipment for applying hot melt glues also are known to those skilled in the art. Current hot melt glues are 100% solid polymeric materials which are reduced to molten thermoplastic materials by heating. A typical hot melt glue is a solid, thermoplastic hydrocarbon material which quickly melts upon heating, and then sets to a bond on cooling, unlike other types of glues which set upon evaporation of a solvent. The materials from which current hot melt glues are made have a high degree of tack, or stickiness, when molten, and are solid upon cooling. Examples of raw materials for hot melt glues include polyethylene, polyvinyl acetate, hydrocarbon resins, asphalts, bitumens, and waxes.

Some examples of current polymeric hot-melt adhesives include the adhesive disclosed in U.S. Pat. No. 4,656,242 describing a polyesteramide composition comprising the polymerization product of a polymeric fatty acid and a dicarboxylic acid, with a substantially equivalent amount of an organic diamine and a diol. The main use for this type of hot-melt adhesive is for metals and plastics, and use in connection with cardboard or other paper products is not disclosed. Another similar hot-melt adhesive is disclosed in U.S. Pat. No. 4,569,985, which discloses an adhesive comprising a polymeric fatty acid, a dicarboxylic acid, an organic diamine and an alkanolamine. This type of hot-melt adhesive is suggested for use in connection with PVC films and no mention of cardboard or other paper products is made. Another general polymeric hot-melt adhesive is disclosed in U.S. Pat. No. 4,602,058, which discloses a hot-melt adhesive comprising polyamides, ethylene polymer containing carboxylic acid groups, organic carboxylic acid compounds and a free radical scavenger or antioxidant. The addition of the organic carboxylic acid improves the thermal stability of the blend. As these three hot-melt adhesives are polymer based, they do not possess the environmentally friendly characteristics which are desirable.

Current hot melt adhesives are applied at temperatures of from between 300° F. and 450° F. All of these materials tend to char in the hot melt glue application system, which eventually causes clogging of the system's dispensing heads. Additionally, due to the high temperatures of application, these products cause severe burns if they come in contact with human skin. These prior art products also are flammable.

Other glues, particularly glues used in the furniture and bookbinding industries, are based upon animal glue manufactured from animal bone and hide resins, fish, blood, and casein. However, in order to use these animal based gelatin glues, the glue has to be melted from a supply gel or cooked from a dry powder and diluted with water prior to application. This dilution typically increases the water content of the glue from 75% to 85%. The additional water changes the nature of the adhesive from a gel to a liquid, thus allowing the application of a very thin film from which water could evaporate, thus causing a bond. The addition of so much water causes problems such as board warpage and location control in many applications, causing manufacturers to use other types of adhesives, such as those with solvent and hydrocarbon bases. Other water-based glues are available, and, like solvent-based materials, are dependent on the evaporation of the solvent to form a strong bond. The evaporation process makes such glues slow to set relative to the hot melt glues, which need only to cool to form a bond. However, as a class, such glues cannot be recycled and are not biodegradable.

Current commercial hot melt glue application equipment is produced by many different manufacturers, including ITW Dynatec and Nordson. The typical hot melt glue application system consists of a heated melting pot, a hydraulic pumping means of either the gear or piston type, a heated feed line, and a heated dispensing head of various designs to apply the liquefied glue material to the substrate being bonded. In general, the hot melt glue application system is in the form of a glue gun. Such guns are well-known and commercially available and in widespread use. Because of the high operating temperatures of the glue guns, they can cause burns to operators and servicing persons.

Several representative hot-melt glue application devices include the hot-melt adhesive gun disclosed in U.S. Pat. No. 4,199,082; the hot-melt cartridge adhesive gun disclosed in U.S. Pat. No. 4,034,484; the hot-melt adhesive applicator gun disclosed in U.S. Pat. No. 4,601,597; and the hot-melt adhesive applicator gun disclosed in U.S. Pat. No. 4,463,877. Each of these guns heats the hot-melt adhesive so as to melt the adhesive in preparation for applying the adhesive to the substrate. Obviously, the hotter the temperature needed to heat the adhesive, the hotter the guns themselves will become. It can be seen that with a lower melting temperature adhesive, lower temperature guns can be used, thus lessening the danger to the operator.

Thus, it can be seen that there is a need for a water soluble, biodegradable, repulpable, glue manufactured from a renewable resource which will have the processing speeds of hot melt glues and the environmental advantages of water based glues. The hot melt glue disclosed and claimed herein is low-cost and environmentally safe and, unlike prior natural adhesives, has a superior handling and application quality and a broad range of industrial applicability.

BRIEF SUMMARY OF THE INVENTION

The present invention is a chemical modification of a natural organic hot melt glue based on animal, mineral and vegetable waterbearing colloidal hydragels. Natural organic materials such as animal hide and bone, fish, blood and casein; soy, starch, cellulosics, hydrocarbon resins and super hydrolyzed polyvinyl alcohols and polyvinyl chlorides are examples of the base materials from which the present hot melt glue and products can be formed. Many of the natural organic solutions occur as a result of supersaturated solutions which are liquid at elevated temperature and are gelatinous at ambient temperature.

The preferred embodiment of the hot melt glue of the present invention has a natural organic material content of up to 90%, preferably from 50 to 70%, a water content of less than 55%, and preferably from 25% to 50%, and the remainder other components to achieve desired storage and application properties, such as sugars for tackifiers and magnesium sulfate to bulk out the product. Additionally, from 2% to 25% lubricants, antioxidants, plasticizers, and humectants are added through a sub-composition preferably comprising, for example, hydrocarbon sodium sulfonate, oxyalkylene polymer, phosphate ester ethoxylate, glycerin, and silicon containing hydrocarbon defoamer to make the product compatible with hydraulic pumping through gear and piston pumps without erosion and corrosion of pump parts. At atmospheric pressure, the product of the present invention preferably is pumpable liquid at a temperature of above approximately 38° (100° F.), and is a hard gel at a temperature of below approximately 38° (100° F.). The viscosity of the melted liquid will drop from its original melt point continuously through a temperature of about 57° C. (135° F.). The gel formed upon cooling has sufficient bond strength to seal paper bags, corrugated and paperboard containers, and other paper products. The preferred application temperature for the product is approximately 43° C. (110° F.).

The water soluble, biodegradable, repulpable, waterbearing colloidal hydrogel of the present invention is capable of being heated and applied to a substrate with automatic hot melt glue application equipment of both the gear and piston type hydraulic pumps, thus allowing dispensing through orfices as small as $7.62 \times 10^{-5}$ m (0.003 inches) and $8.38 \times 10^{-4}$ m (0.033) inches within the normal and usual pump pressures as if hydrocarbon hot melt glue were being applied, that is at pressures in the 10345 torr to 20690 torr (200 psi to 400 psi) range. However the product of this invention can be subjected to pressures as high as 62070 torr (1200 psi), which is the maximum continuous operational range of current hot melt applicator systems. The product of this invention also is suitable for injection molding.

The preferred substrates are paper bags which need sealing, corrugated and paperboard cartons, and other paper products. The hot melt glue of the present invention is water-based and has a low melting point when compared to the prior art, and has a higher range of applicability, a higher quality seal, and a relatively low cost. Further, the hot melt glue of the present invention is non-flammable and can be reactivated by heat, allowing resealing of the container.

The hot melt glue of the invention disclosed herein can be formed into gelatinous shapes to manufacture products unrelated to glues. Injection moulding, extrusion, and casting are acceptable means of forming these shapes. For example, the hot melt glue can be extruded into beads similar in size and shape to natural earth worms and can be used as fishing lures. Various flavorings, scents and colors may be added to the material to make it more appealing to the fish, increasing the chances that the lure will be successful. The biodegradable nature of the material makes such a fishing lure product more desirable than current products from an environmental point of view. Current products are manufactured from polyvinyl chloride and will virtually never degrade.

Accordingly, it is an object of the present invention to produce a plasticized hot melt glue based on organic animal, mineral and/or vegetable colloidal hydrogels.

It is another object of the present invention to produce a water soluble, biodegradable, repulpable, low melting point, non-flammable, non-toxic colloidal hydrogel which can be used as a hot melt glue and dispensed through hydraulic means without corrosion and erosion of the internal pump parts.

A further object of the present invention is to produce a hot melt glue which is capable of sealing paper products and acting as a sealant for corrugated and paperboard cartons.

Yet another object of the present invention is to produce a colloidal hydrogel hot melt glue capable of being reactivated and heat sealed.

Another object of the present invention is to produce a hot melt glue having a high natural organic renewable resource content, preferably greater than 60% solids, and a relatively low water content, preferably less than 40% water.

These objects, and other objects features and advantages of the present invention, will become more apparent to one skilled in the art upon reading the following detailed description of the preferred embodiments.

DETAILED DESCRIPTION OF THE PREFERRED EMBODIMENTS

The preferred embodiment of the present invention is a biodegradable and repulpable hot melt glue for use in piston or gear type hot melt application devices having a solids content of up to 90% by weight, and preferably 65% by weight, and a water content of less than 55% by weight, and preferably 35% or less by weight. The above-described mixture is a liquid at over approximately 38° C. (100° F.) at atmospheric pressure, and a gel at below approximately 38° C. (100° F.) at atmospheric pressure, and demonstrates a linearly degrading viscosity with increases in temperature up to 60° C. (140° F.) at a constant water content, and further includes components which protect internal pump components from corrosion and erosion. The gel formed upon cooling has sufficient strength and consistency to bond to the substrate, such as the paper bag, the corrugated cannon or other paperboard products. A typical preferred formula is prepared in two stages as follows:

Primary Sub Mixture

| Component | Preferred | Range |
|---|---|---|
| water | 10 parts | 5–15 |
| oxyalkylene polymer 300 MW | 50 parts | 25–75 |
| oxyalkylene polymer 3500 MW | 150 parts | 100–200 |
| glycerine 96% USP | 50 parts | 25–75 |
| complex ethoxylate | 20 parts | 10–30 |
| sodium alkyl sulfonate | 10 parts | 5–15 |
| hydrocarbon defoamer | 20 parts | 10–30 |
| cetylpyridinium chloride USP | 4 parts | 2–6 |

Secondary Sub Mixture

| Component | Preferred | Range |
| --- | --- | --- |
| water | 35 parts | 20–50 |
| glue solids | 25 parts | 15–40 |
| sugar solids | 20 parts | 10–30 |
| magnesium sulfate | 15 parts | 5–25 |
| starch | 3 parts | 1–5 |
| odorant | 1 part | 0–3 |
| antimicrobial | 1 part | 0–3 |

The preferred gel formed upon cooling below 38° C. (100° F.) must demonstrate sufficient bond strength to hold the substrate being bonded until a sufficient amount of moisture is evaporated so as to form a commercially acceptable bond. In other words, the gel, as applied to the substrate, has a certain amount of moisture in it. As applied, the adhesive must wet out the surfaces, thus reducing the amount of moisture in the adhesive, and at the same time cool to form a strong gel capable of holding the joined surfaces until further evaporation causes a bond which is stronger than the surfaces being joined. Thus, the destruction of a fully set bond will result in the failure of the substrate rather than the bond line.

Additionally, because the hot melt glue of this invention is water based, lubricants and antioxidants must be present to allow for continuous operation in gear and piston type hydraulic pumps of the type used in the manufacture of commercially available hot melt glue application equipment to reduce the abrasive and corrosive nature of water bearing glues under high heat and pressure. Additionally, water bearing glues must maintain some moisture to maintain a degree of flexibility and yet must not be so hygroscopic so as to fail under high humidity conditions. A hot melt glue having the above formula has such properties.

The first 4 components of the primary sub mixture are mixed by agitation and heated to 60° C. (140° F.) and held at that temperature for 15 minutes or until the melt point of the solid component is reached and the molecular weight of the components is equilibrated. This is signified by a clear mixture. The remainder of the components of the primary sub mixture are added and the heat is removed under continued agitation. The mix is allowed to cool until a heavy paste is formed, at which time the material can be stored for later addition to the adhesive mixture at percentages of from 2% to 10% depending on the desired properties of the final adhesive. If too much water evaporates from this mixture during the mixing process, the result will be a soft solid upon cooling below 38° C. (100° F.).

The water and glue components of the secondary sub mixture are combined in ambient temperature water and heated to 60° C. (140° F.). The remainder of the components of the secondary sub mixture are added to the water and glue mix and dissolved while heat is added to increase the temperature to 71° C. (160° F.). This assures complete solution and microbial destruction. The heat is removed and the temperature is allowed to fall to 57° C. (135° F.). When the secondary sub mixture reaches a temperature of approximately 57° C. (135° F.), the desired quantity of material from the primary sub mixture is added.

The glue of the secondary sub mixture may be any hide or bone glue; however, the strength of this component may significantly change the strength of and the gelation time of the finished component. Hide glue of from 300 to 400 gram strength are recommended, while a usable product of bone glue at 200 gram strength has been demonstrated.

Sugars are the preferred tackifier as they demonstrate minimal effect on gel time which is critical for optimum speed in packaging glues. Corn syrup can be used but it has detrimental effect on gel or open time, and creates a stringy product which is not conducive to use in hot melt glue application equipment. Starch components add a pasty tack to the mix. An odorant and antimicrobial are added to maintain shelf life and a consistent odor to the finished product.

There are many combinations of this glue formula, but in most applications for use in hydraulic piston and gear pumping systems, a glue having the narrowest thermal gel point and the strongest gel is preferred.

The minimum effective addition of the primary sub mixture to the secondary sub mixture is around 2% by weight primary sub mixture. While tests have been conducted with additions as high as 25% by weight primary sub mixture, the effectiveness diminishes after added rate of 10% by weight primary sub mixture. Since the melt viscosity of the final glue product was approximately the same with additions of from 2% to 10% by weight of the primary sub mixture, improved performance was measured by weighing the output of a hot melt glue gun held under steady state conditions, that is, steady state heat, time, pressure, and orfice conditions. The output continued to increase until 10% by weight primary sub mixture addition levels were reached, at which time the increases were reduced at an increasing rate. Since the viscosity of the product was the same, the resulting increase in output can only be attributed to a lower coefficient of friction due to lower abrasiveness of the melted glue product of this invention.

The product of the primary sub mixture can be varied by changing the molecular weight of the components, specifically the molecular weight of the oxyalkylene polymers. Any molecular weights oxyalkylene polymers are suitable for this invention and are considered in the product of this invention. Higher molecular weights, however, start to increase the melt viscosity, while lower molecular weights have the opposite effect. The preferred formula was chosen to have as small a change on a starting glue formula as possible. Additionally, the highest molecular weight possible without melt viscosity change was chosen because of its effect on the flexibility of the final glued product. Higher molecular weights have a much lower level of hygroscopicity; therefore, while acting as a plasticizer, higher molecular weight components are much less affected by changes in relative humidity and thus result in a more stable finished product.

After combining the secondary sub mixture with the desired amount, usually from 2% to 10% by weight, of the primary sub mixture, the hot material is cast into slabs of approximately 3.4 kg (7.5 pounds) each. These slabs are cooled and serrated into approximately 5 cm (2 inch cubes), leaving a thin web to one side of the slab to facilitate handling. These slabs are wrapped in polyethylene wrap to avoid moisture loss and packed in cartons of approximately 23 kg (50 pounds). The product is sold in pallet loads of 910 kg (2000 pounds). At the user's facility, the cartons are opened and the serrated cubes are torn apart and placed in the hot melt glue applicator hopper where they are used as if a hydrocarbon hot melt glue, with the exception that the thermostats are reduced from the typical 177° C. (350° F.) to 43° C. (110° F.) needed for the product of this invention. It is obvious to one skilled in the art that a purge of the hot melt system with a low melt solvent is required to make the final change to the safer lower temperatures.

For the purposes of the following examples, a hot melt glue was manufactured to the preferred specification of this invention. The hot melt glue was applied to various sample products using a Meltex Glutronic hot melt glue gun, model TR34, adjusted to a temperature of 66° C. (150° F.). The glue was applied to two sample containers. Sample 1 was 91 kg (200 pound) test corrugated coupon, cut 5 cm (2 inches) by 15 cm (6 inches) and scored at the longitudinal centerline. Sample 2 was cut 5 cm (2 inches) wide from a portion of 19 kg (42 pound) Stone Container linerboard.

The addition of each component of the primary sub mixture to the secondary sub mixture produces different results than the preferred method. In other words, by varying the amount of each primary sub mixture component, or each secondary sub mixture component, adhesives and products of varying properties are made.

The sodium hydrocarbon sulfonate (duPont AVITONE A) is a softening and lubricating agent typically used in textile finishing agents to soften and lubricate the product for ease in sewing. Sodium hydrocarbon sulfonate is not soluble in water, but is compatible with starch. It also has been shown to soften polyvinyl acetate adhesives. It is suitable for rewetting. Other plasticizers include esters, polyols, phosphates, and the like, and their derivatives.

The phosphate ester ethoxylate (duPont Merpol A) is a wetting agent dispersible in water but is not soluble in water. Other wetting agents include suitable soaps, alcohols, and fatty acids.

The oxylalkylene polymer (Union Carbide Polyethylene Glycol) is a water soluble polymer (which is not soluble in gelatin) which can be used as a lubricant, metal corrosion inhibitor, release agent, humectant and plasticizer. However, it has never been used in conjunction with gelatin since it is not soluble in this medium. It has been used to modify the melt freeze range of hydrocarbon hot melt glue and the viscosity of cold glue. The present formula calls for two blended oxylalkylene polymer products. This is done to arrive at a molecular weight which is not commercially available and to balance the melting points and hygroscopicity of the polymers to the maximum without increasing the viscosity of the hot melt glue. Higher molecular weights start an increase in viscosity and add a stringy property which is undesirable. Those skilled in the animal glue business do not know of any such use.

The water is used only to keep the primary sub mixture from freezing making it difficult to handle. The glycerine is added only as a humectant to hold the water in place. The hydrocarbon defoamer (Ross Chemicals 380S) make the product of the primary sub mixture easier to accomplish. More importantly, it adds lubricants to the system and reduces the potential for foam which can be generated when pumping the finished hot melt adhesive in gear pump hydraulic application systems. It is not water soluble, but only water dispersible.

EXAMPLE 1

Spring Back Test. A 0.24 cm (3/32") bead of adhesive 7.6 cm (3") long was applied to Sample 1. After three seconds, Sample 1 was folded over on itself with the bead of adhesive between the folds of the sample. The folded sample was held compressed for three seconds. No spring back opening was considered a pass. All samples passed.

EXAMPLE 2

Pull Test. A 0.24 cm (3/32") bead was applied to the center line of a 5 cm (2") wide piece of Sample 2. A second 5 cm (2") wide piece of Sample 2 was placed on top of the adhesive and the two pieces of Sample 2 were compressed together with the bead of adhesive in between. The samples were set aside for five (5) minutes. The combined sample was then pull tested. Demonstrated fiber pull was considered a pass. All samples passes.

EXAMPLE 3

High Temperature Cycle 1. Samples made in accordance with Example 1 were stored in a warehouse atmosphere for two (2) hours. The samples were then placed in an oven at a temperature of 74° C. (165° F.). No spring back opening after fifteen (15) minutes was considered a pass. All samples passed.

EXAMPLE 4

High Temperature Cycle 2. Samples made in accordance with Example 1 were stored in a warehouse atmosphere for four (4) hours. The samples then were place in an oven at a temperature of 82° C. (180° F.). No spring back opening after fifteen (15) minutes was considered a pass. All samples passed.

EXAMPLE 5

Humidity Test. Four (4) samples from Example 4 and two (2) samples from Example 1 were place in a humidity chamber for seventy-two (72) hours. The humidity chamber had a tray of water in it to provide a humid atmosphere. No spring back opening was considered a pass. All samples passed.

EXAMPLE 6

Humidity and Temperature Cycle Test. The six (6) samples from Example 5 were removed from the humidity chamber and placed in a cool oven. The oven was turned on and the temperature was allowed to rise to 85° C. (185° F.). No spring back opening after fifteen (15) minutes was considered a pass. All samples passed.

EXAMPLE 7

Solvent Test. Samples as made in accordance with Example 1 were dipped in gasoline. The samples were placed in a sealed container for an extended period of time. No spring back opening after twelve (12) hours after being dipped in gasoline was considered a pass. All samples passed.

EXAMPLE 8

Humidity Pull Test. Four (4) samples made in accordance with Example 2 were suspended horizontally in a humidity chamber as described in Example 5. A 100 gram weight was affixed to the lower piece of the samples. The samples were maintained in the humidity chamber for seventy-two (72) hours. No glue release was considered a pass. All samples passed. A 0.16 cm (1/16") movement of the lower sample piece relative to the upper sample piece was noted; however, the movement was the result of fiber pull and not glue failure.

EXAMPLE 9

Freeze Test. The adhesive was formed into a 100 gram sample from the Meltex hot glue gun. The formed sample was place in a freezer at −18° C. (0° F.) for seventy-two (72)

hours. The lack of formation of internal ice crystals was considered a pass. All samples passes.

EXAMPLE 10

Freeze Spring Back Test. The freeze-tested sample of Example 9 was cut into pieces and placed back in the hot melt glue gun. The adhesive then was heated and applied to a specimen of Sample 1 as in Example 1, and subjected to the Spring Back Test. No spring back opening was considered a pass. All samples passed.

EXAMPLE 11

Aging Test. The adhesive was left in the hot melt glue gun for one week with the heat set at 30% above the recommended application temperature. A lack of charring of the adhesive was considered a pass. All samples passed.

EXAMPLE 12

Water Solubility Test. 10 grams of the adhesive was extruded into a beaker containing 100 ml. of tap water. The sample was left in the tap water for seven (7) days. Degradation of the sample into the tap water was considered a pass. The sample degraded into a cloudy liquid. All samples passed.

Similar tests have been run utilizing ITW Dynatec, Dynapro Model 002 (gear pump). ITW Dynatec Model 200 (piston pump), and Nordson Model 2304 (piston pump) with a modified control board to allow for lower operating temperatures. Additionally, the product of this invention is the only hot melt adhesive to have passed the repulpability test standard No. 2 as prescribed and performed by Stone Container Corporation Adhesives research lab in Cantonment, Fla. This test calls for the complete breakdown of the sample in plain tap water and with heat not to exceed 38° C. (100° F.). Additionally, the sample adhesive passed all performance tests for the manufacture of industrial multi-wall bags when performed by this same laboratory.

As the above examples demonstrate, the hot melt glue of the present invention has all of the desirable properties of current polymeric hot melt glues. However, the product of the present invention is environmentally responsible in that it is water-based, water-soluble, biodegradable, repulpable and of a very low toxic order. Further, the present invention has a significantly higher solids content than the prior art hot melt glues. Prior art hot melt glues have approximately 65 to 85% water. The hot melt glue of the present invention typically has 55% or less water, generally within the range of 25 to 45% water, with 35% water preferred. Therefore, the hot melt glue of the present invention combines the desirable properties of synthetic adhesives with the environmental benefit of natural organic adhesives.

Although the hot melt glue of the present invention acts and feels like current hot melt glues, it is applied at a significantly lower temperature. Current hot melt glues typically are applied at temperatures in the range of approximately 150° C. (300° F.) to 230° C. (450° F.). The present hot melt glue liquefies and can be applied at temperatures as low as 38° C. (100° F.). The lower application temperature lowers the energy costs necessary for applying the glue, reduces the cool-down time of the glue and allows application of the glue to a wider range of materials such as materials which cannot stand temperatures above 125° C. The lower application temperature also results in increased operator safety and energy savings.

In a similar vein, current hot melt adhesives are stored in melt pots in the glue application system maintained at the very high, 150° C. (300° F.) to 230° C. (450° F.), application temperatures. Extended exposure to the application temperature causes the current hot melt glues to degrade and break down thermally, resulting in a char forming and building up in the tank, hoses, and dispensing heads, thus clogging up the application unit. These materials break loose and can clog the applicator head orfices rendering the machine disabled. Many operators and service employees are burned every year from this hazardous situation. Additionally, the only way to completely remove this char is to dismantle the machines and wash them with solvent. This cannot be done with the hoses, so they must be discarded.

On the contrary, the hot melt glue of the present invention does not char when subjected to the lower application temperature for an extended period of time. Because of the low temperature of the present invention, the product hot melt glue does not breakdown and form char. If the hot melt glue of the present invention becomes too viscous, because it is water-soluble, by adding additional water, the hot melt glue of the present invention can be returned to the operating viscosity. Thus, if over a time, a blockage due to dehydration does occur, a simple water cleanup is all that is required. Even a catastrophic failure such as a run away temperature control will not cause the disaster fire potential of a polymeric hot melt. The complete charing of the glue of the present invention can be removed by soaking in hot soapy water.

The above detailed description of the preferred embodiments and examples are presented for illustrative purposes only and are not meant to limit the scope and spirit of the present invention and its equivalents as defined by the appended claims.

What is claimed is:

1. A biodegradable, water soluble, and repulpable hot melt adhesive comprising:

from 50 to 70% by weight hydrocolloids; and from 25 to 50% by weight water;

said hot melt adhesive having a melting point below approximately 43° C.

2. The hot melt adhesive as claimed in claim 1, wherein said hydrocolloids are selected from the group consisting of animal hide and bone, fish, blood, gelatin, casein, vegetable, grain, legume, starch, cellulosic, hydrolyzed polyvinyl alcohol, and hydrolyzed polyvinyl chloride.

3. The hot melt adhesive as claimed in claim 1, further comprising water soluble oxyalkylene polymers having molecular weights from 300 to 3500.

4. The hot melt adhesive as claimed in claim 1, wherein said hot melt adhesive liquefies at a temperature of approximately 38° C.

5. The hot melt adhesive as claimed in claim 1, further comprising saccharose.

6. The hot melt adhesive as claimed in claim 1, further comprising a sodium alkyl sulfonate.

7. The hot melt adhesive as claimed in claim 1, further comprising glycerin.

8. A hot melt adhesive comprising:

a. from 10 to 90% by weight natural organic materials, said natural organic materials comprising glue solids selected from the group consisting of animal hide and bone, fish, blood, casein, vegetable, grain, legume, starch, and cellulosic;

b. from 10 to 50% by weight water;

c. up to 40% by weight carbohydrate; and d. up to 60% by weight salt;

wherein said carbohydrate is saccharose and said salt is a magnesium sulfate.

9. The hot melt adhesive as claimed in claim 8 having a liquefication temperature of between approximately 37° (98° F.) and 43° (110° F.).

10. A method for producing a water-based organic hot-melt adhesive, comprising the steps of:

a. combining a first oxyalkylene polymer and a second oxyalkylene polymer to create a polymer mixture having an overall average molecular weight of between 300 and 3500 to obtain the desired balance between the melting point and hygroscopicity of the polymer mixture and the viscosity of the hot melt adhesive;

b. producing a primary submixture comprising water, the oxyalkylene polymer mixture and glycerin by mixing by agitation the water, the oxyalkylene polymer mixture and the glycerin being at a temperature of between 50° C., and 70° C., and holding the primary submixture at this temperature until the melt point of the oxyalkylene polymer mixture is reached;

c. reducing the temperature of said primary submixture until said primary submixture forms a heavy paste; and d. producing a secondary submixture comprising water and glue solids by mixing the water and glue solids at a temperature of between approximately 50° C. and 70° C.; and e. combining from about 2% to 10% of the primary submixture and about 98% to 90% of the secondary submixture at a temperature of between approximately 52° C. and 62° C.

11. The method as claimed in claim 10, further comprising the step of adding to the primary submixture an ethoxylated phosphate, a sodium alkane sulfonate, and ceptylpyridinium chloride.

12. The method as claimed in claim 11, wherein said primary submixture comprises from 1 to 8% by weight water, from 39 to 83% by weight oxyalkylene polymer, from 6 to 32% by weight glycerin and from 7 to 34% by weight the other components.

13. The method as claimed in claim 12, wherein said secondary submixture comprises from 16 to 62% by weight water, from 11 to 53% by weight glue solids, and from 15 to 65% by weight a mixture of starch, and magnesium sulfate; wherein said glue solids are selected from the group consisting of animal hide and bone, fish, blood, gelatin, casein, vegetable, grain, legume, starch, cellulosic, hydrolyzed polyvinyl alcohol, and hydrolyzed polyvinyl chloride.

14. A hot-melt adhesive comprising a primary submixture and a secondary submixture, said primary submixture comprising from 1 to 8% by weight water, from 39% to 83% by weight water-soluble oxyalkylene polymers having molecular weights from 300 to 3500, from 6 to 32% by weight glycerin, and from 7 to 34% by weight primary submixture additives; and said secondary submixture comprising from 16 to 62% by weight water, from 11 to 53% by weight glue solids, and from 15 to 65% by weight secondary submixture additives; wherein said glue solids are selected from the group consisting of animal hide and bone, fish, blood, gelatin, casein, vegetable, grain, legume, starch, cellulosic, hydrolyzed polyvinyl alcohol, and hydrolyzed polyvinyl chloride.

15. The hot-melt adhesive as claimed in claim 14, wherein said primary submixture additives are selected from the group consisting of an ethoxylated phosphate, a sodium alkane sulfonate, and ceptylpyridinium chloride.

16. The hot-melt adhesive as claimed in claim 15, wherein said secondary submixture additives are selected from the group consisting of starch, corn syrup, saccharose, and magnesium sulfate.

17. The hot-melt adhesive as claimed in claim 16, comprising from 98% to 90% of said secondary submixture and from 2% to 10% of said primary submixture.

18. The method as claimed in claim 10, further comprising the step of adding to the primary submixture a sodium alkane sulfonate.

19. The method as claimed in claim 10, further comprising the step of adding to the primary submixture phosphate ester ethoxylate.

20. The method as claimed in claim 10, further comprising the step of adding to the secondary submixture a magnesium sulfate.

21. The method as claimed in claim 10, further comprising the step of adding to the secondary submixture a component selected from the group consisting of corn syrup, starch, and saccharose.

\* \* \* \* \*